Oct. 4, 1966   W. M. ALLEN ETAL   3,276,352
APPARATUS FOR CONTINUOUSLY PROCESSING FRANKFURTERS
Filed May 27, 1963   8 Sheets-Sheet 8
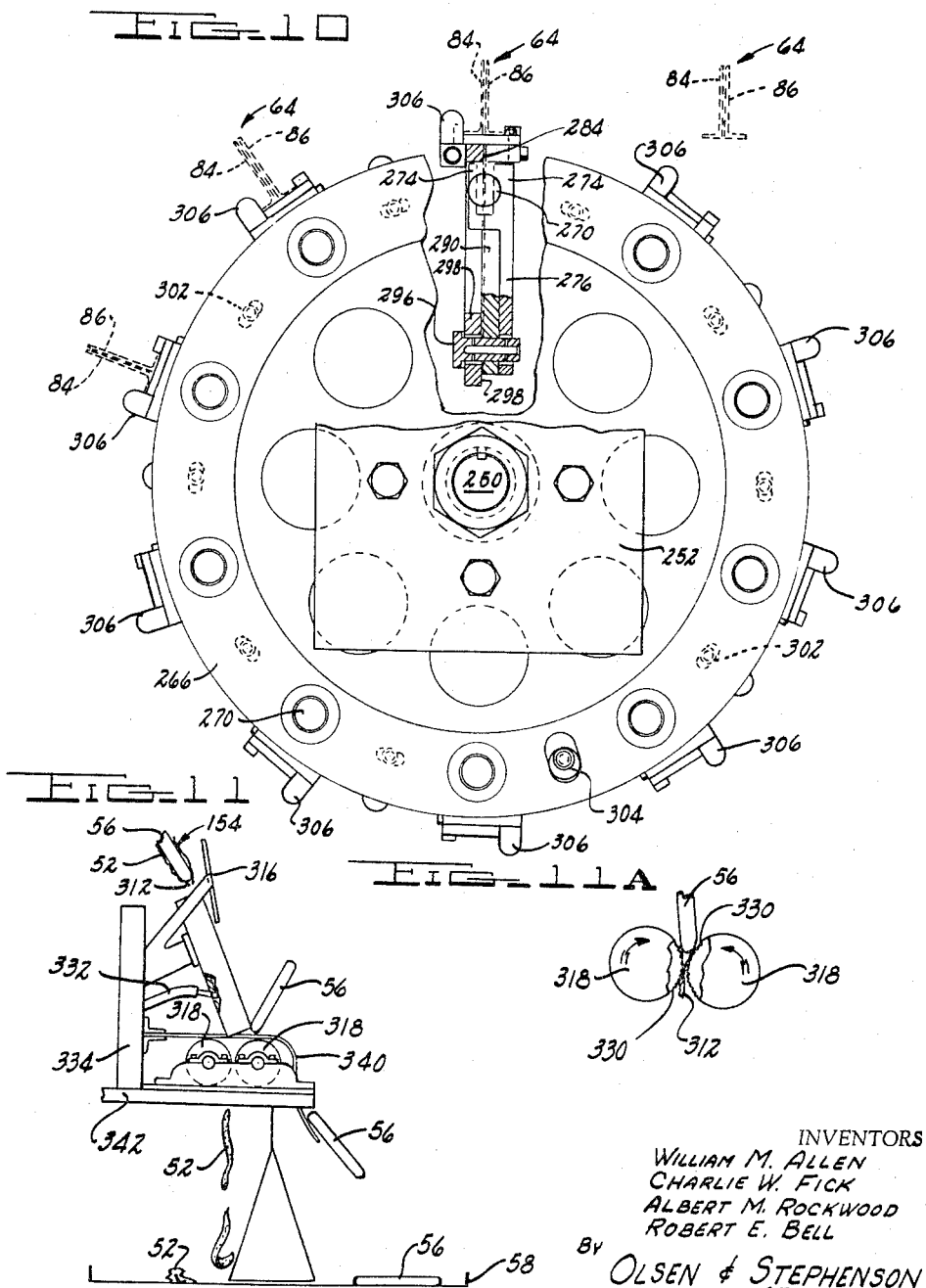
INVENTORS
WILLIAM M. ALLEN
CHARLIE W. FICK
ALBERT M. ROCKWOOD
ROBERT E. BELL
BY OLSEN & STEPHENSON
ATTORNEYS United States Patent Office 3,276,352
Patented Oct. 4, 1966

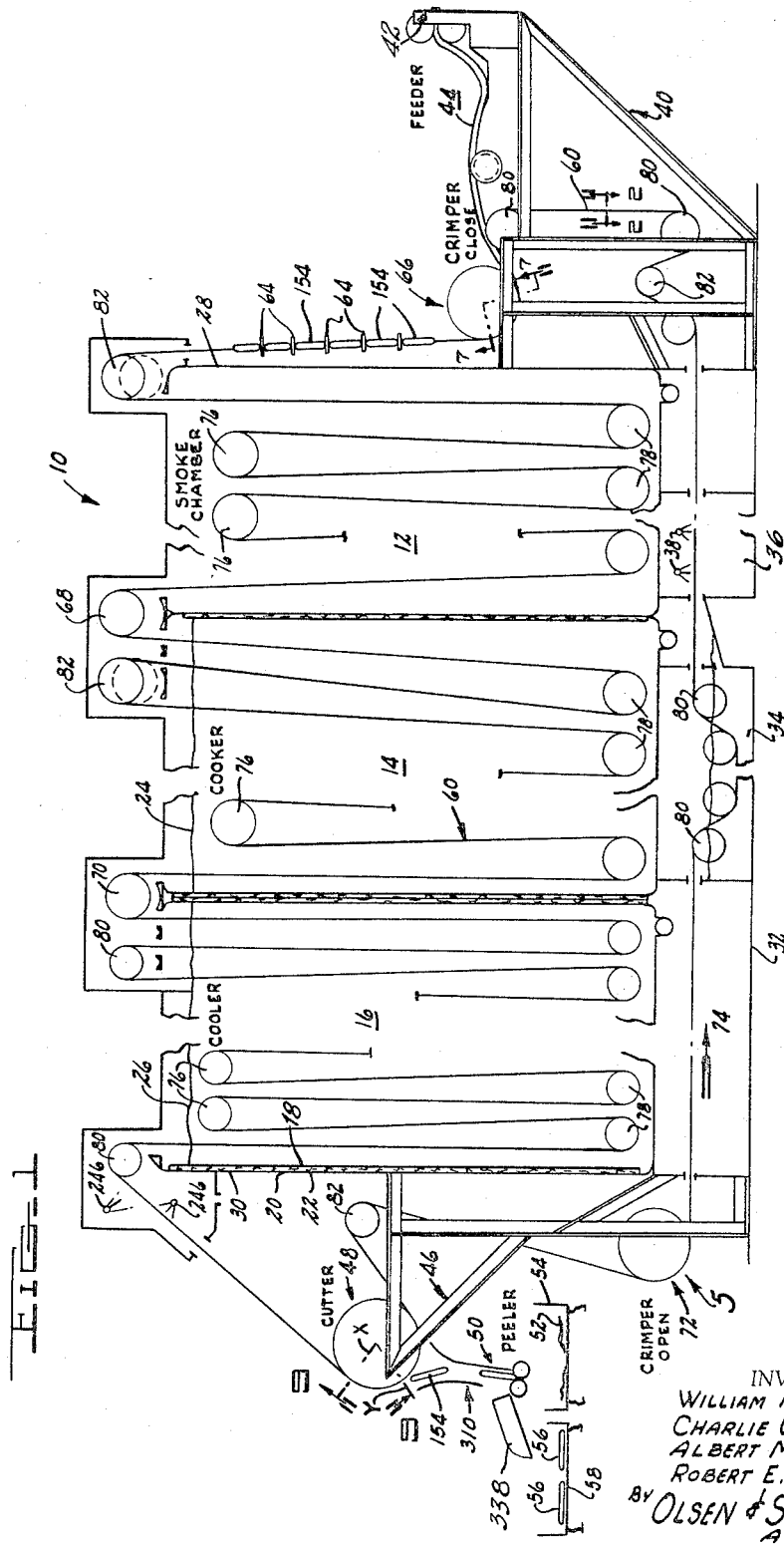

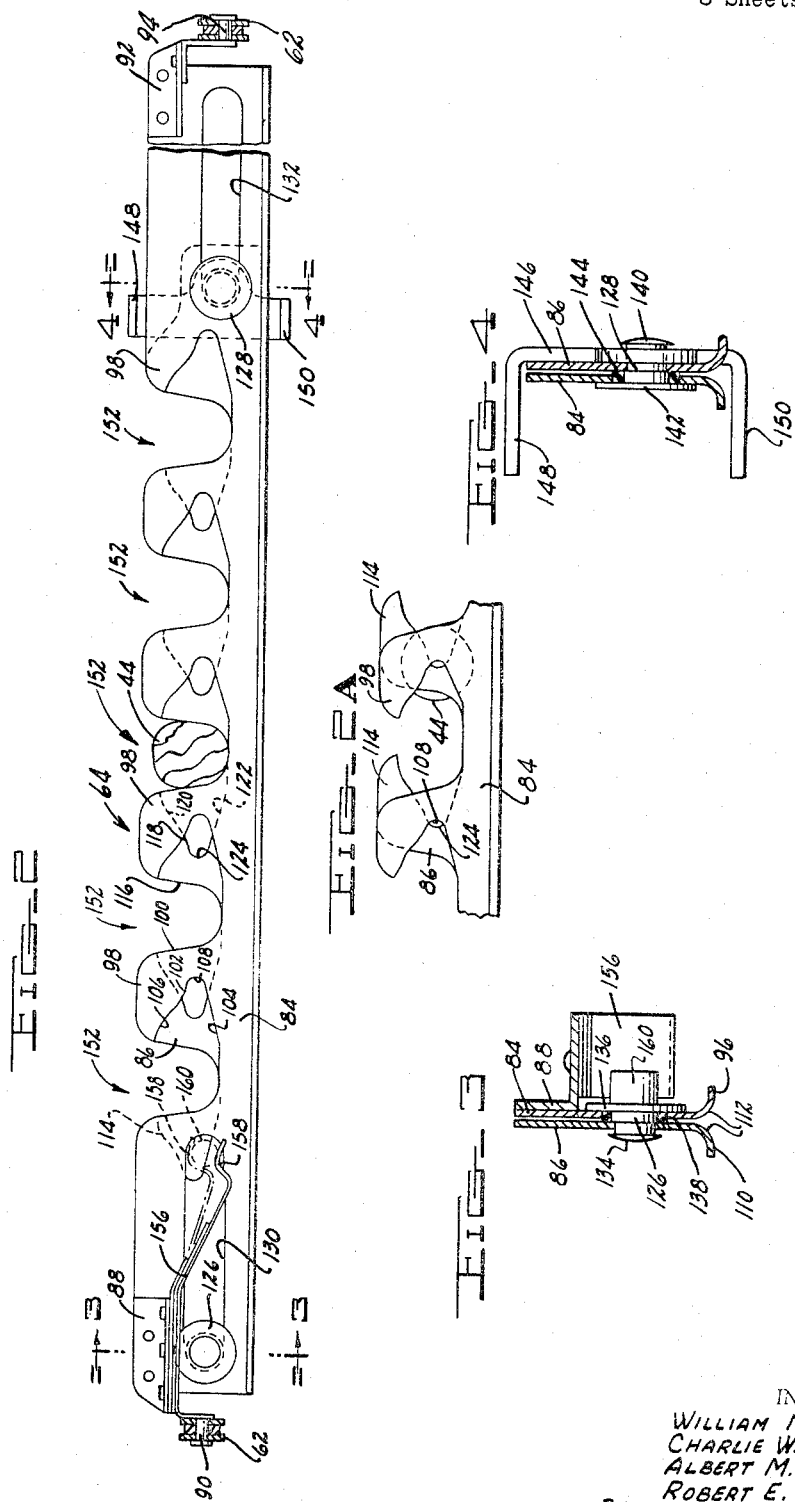

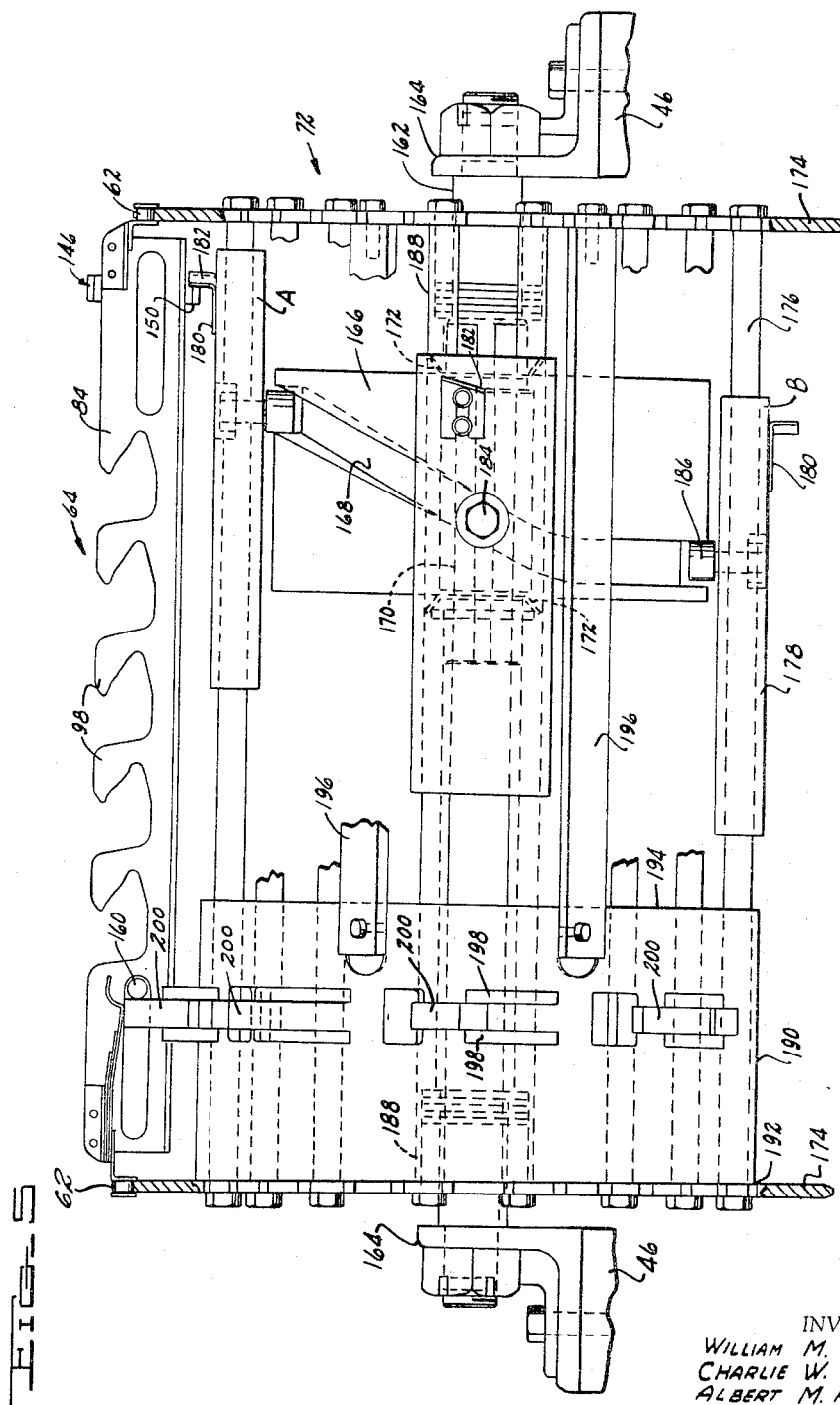

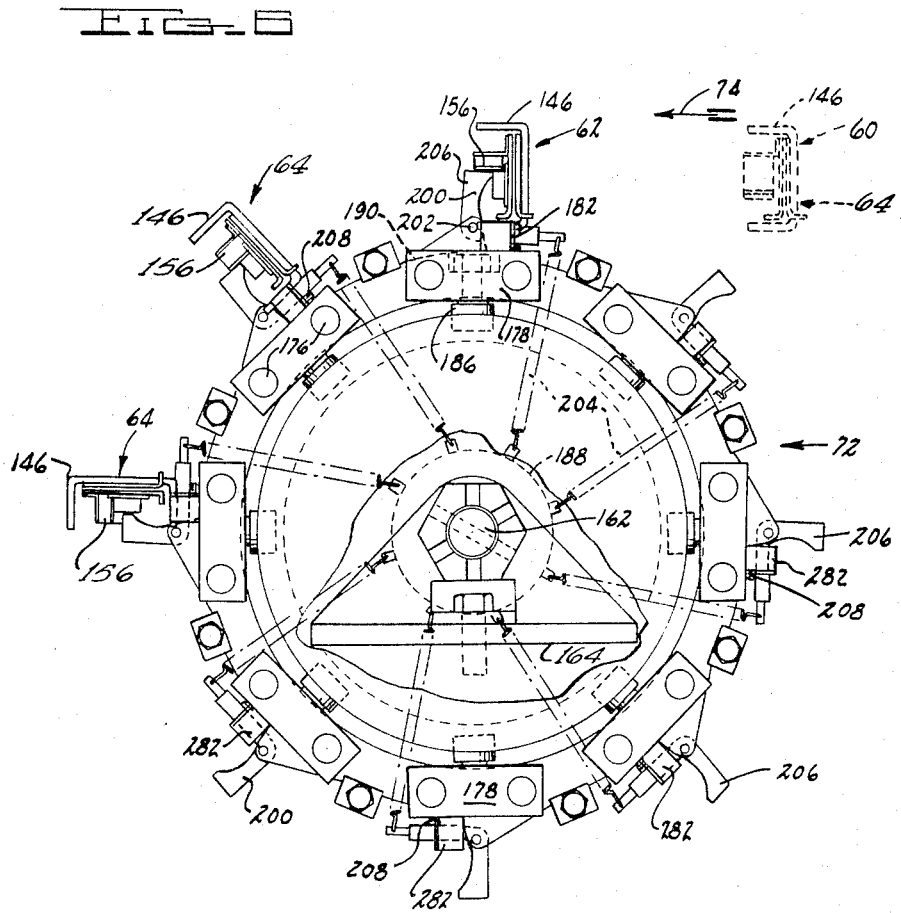

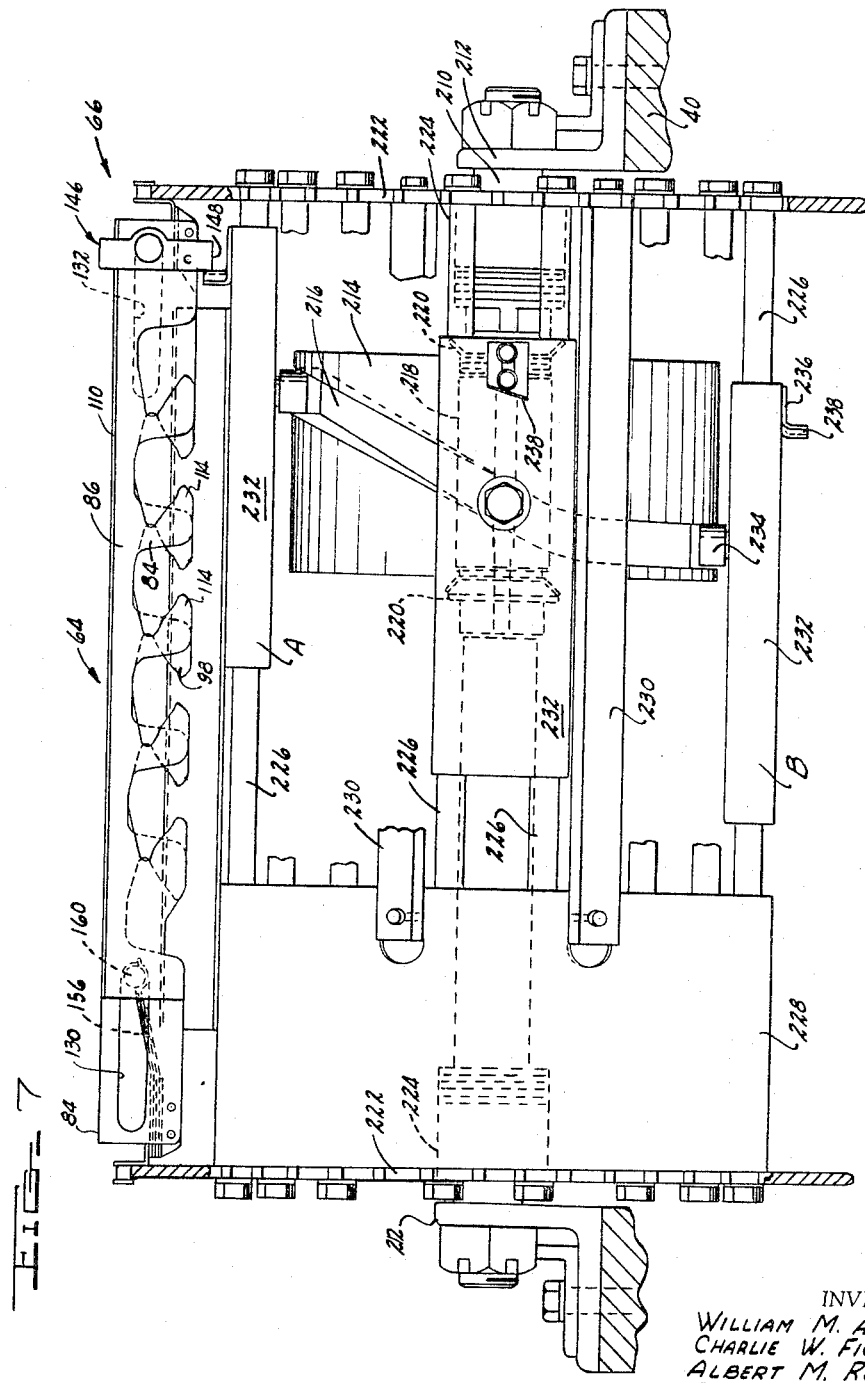

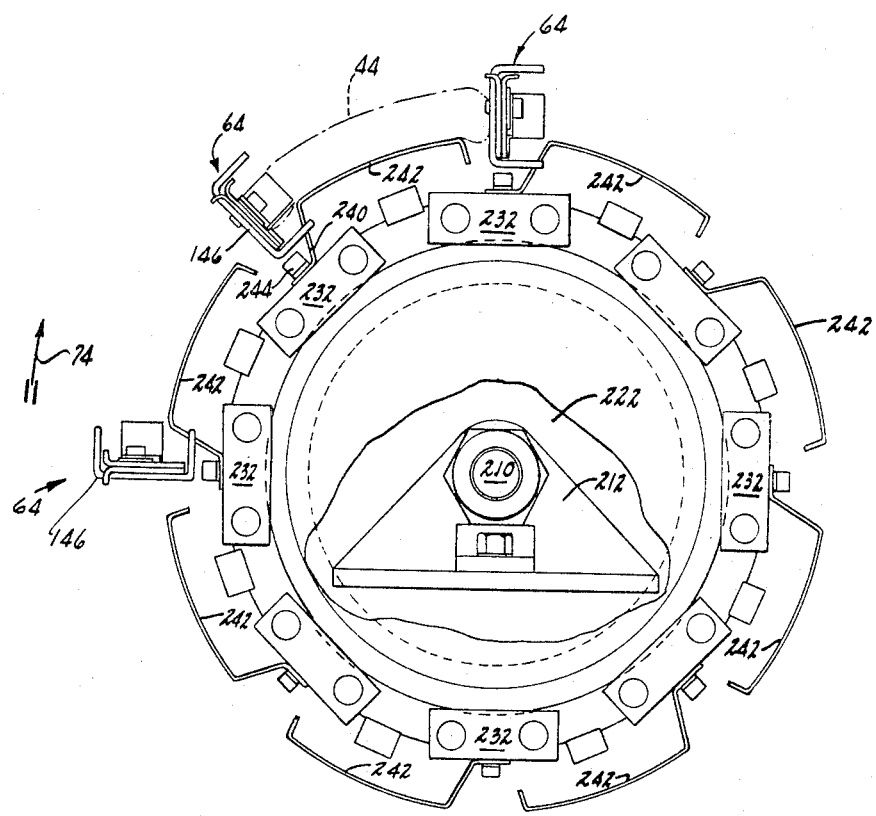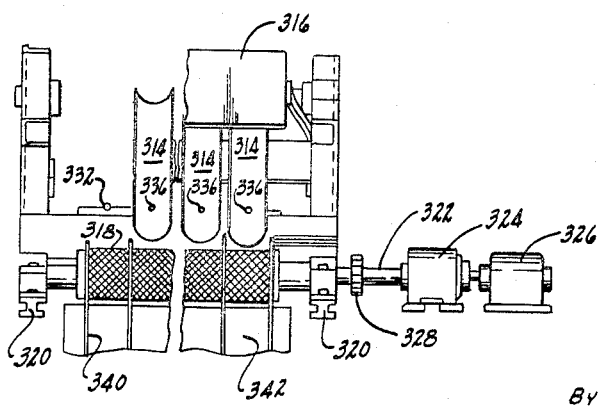

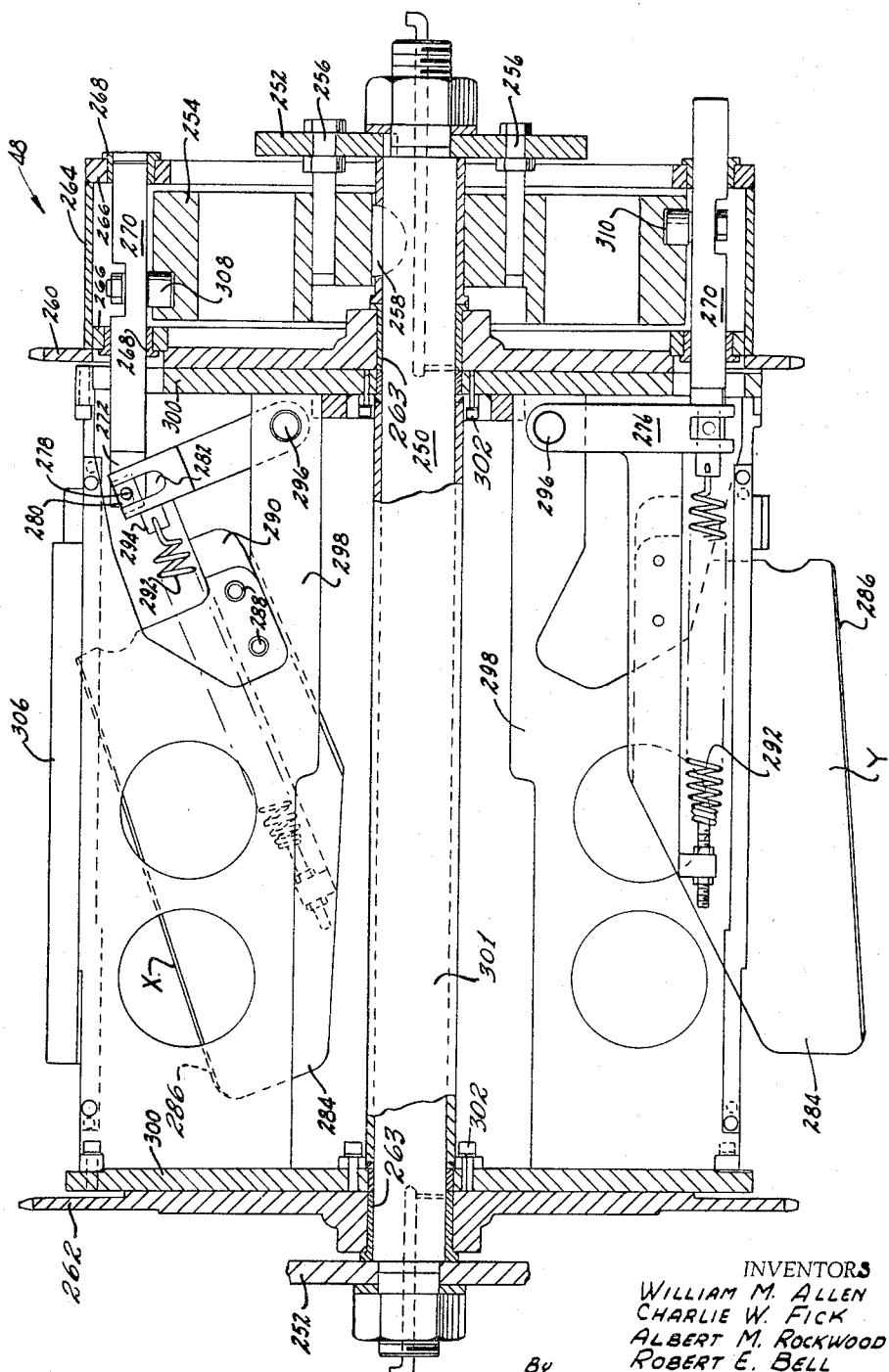

3,276,352
APPARATUS FOR CONTINUOUSLY PROCESSING FRANKFURTERS
William M. Allen and Charlie W. Fick, Columbus, Ohio, Albert M. Rockwood, North Muskegon, Mich., and Robert E. Bell, Columbus, Ohio, assignors, by mesne assignments, to Hoover Ball and Bearing Company, Saline, Mich., a corporation of Michigan
Filed May 27, 1963, Ser. No. 283,193
7 Claims. (Cl. 99—352)

This invention relates generally to apparatus for preparing meat products, and more particularly to improved apparatus for continuously processing skinless frankfurters. This application is a continuation-in-part of our prior copending application, Serial No. 54,630 filed September 8, 1960 now Patent No. 3,159,868.

Skinless frankfurters are usually produced by first stuffing a length of casing, usually formed of cellophane or regenerated cellulose, with a comminuted meat mixture, which varies from one packing house to another as to specific content including the amount and kind of flavoring, seasoning, etc. The ends of the filled casing are tied off and the casing is tied, usually with twine, at predetermined intervals along its length so as to divide it into frankfurter length sections. A plurality of casings, subdivided into links by the tying twine wrapped around the casings, are then hung in loops on racks which carry the casings through a smokehouse or oven. The casings are first smoked and the temperature of the oven is then increased to a temperature sufficient to cook the meat. After cooking, the stuffed casings are subjected to a plumping treatment by exposure to steam. The frankfurters are then cooled, following which the casings are removed by a mechanical peeling machine. The above described process is objectionable to some extent because of the prolonged period of time involved, sometimes in the neighborhood of sixteen hours, the amount of manual labor involved, and the fact that some of the frankfurters become damaged during the mechanical peeling process.

It is an object of this invention, therefore, to provide improved apparatus for processing frankfurters which is continuous in that it is substantially automatic, is faster, involves a minimum of manual labor, and avoids damage to the frankfurter during removal of the casing. It is also an object of this invention to provide improved apparatus for continuously processing frankfurters in which: a plurality of stuffed casings, after they have been divided into frankfurter length sections, are cooked in a wet cooking liquid which provides for hydration of the casings without adding cooking liquid to the meat therein; following the cooking step, the frankfurter length sections of the casings are separated from each other; each casing section, while in a hydrated condition, is removed from the frankfurter therein by pulling the wet casing section lengthwise off the frankfurter; an improved conveyor assembly is provided for automatically crimping the casing at longitudinally spaced position determined by the desired length of the frankfurters produced prior to the travel of the casings through the cooking liquid; an improved cutter assembly which is operable to cut the crimped portions of the casing while it is on the conveyor is provided, and improved crimper assemblies which are locked in closed positions to crimp the casings and which cooperate with the cutter assembly are provided.

In the apparatus of this invention, a plurality of membranes or casings, stuffed with the desired comminuted meat mixture, are continuously fed to an endless conveyor which travels first through a smoke chamber or tank, then through a cooking tank filled with a particular cooking liquid, and finally through a cooling tank having a cold liquid therein. As the conveyor emerges from the cooking tank, it travels around the outside of the smoke, cooking and cooling tanks to the point where it initially enters the smoke chamber. The conveyor carries a plurality of crimper assemblies, adjacent ones of which are spaced apart a distance corresponding to the desired length of the frankfurters to be processed and each of which is operable to crimp the number of casings which are to be continuously supplied to the machine for concurrent travel through the machine. A "crimper close and latch assembly" operates to close and latch each crimper assembly about the casings deposited therein prior to entry of the casings into the smoke chamber. Following travel of the casings out of the cooling tank, the conveyor travels around a cutter assembly which operates to cut the crimped portions of the casings so that frankfurters encased in lengths of casings slightly longer than the frankfurters are released from the conveyor at the cutter assembly. These frankfurters are guided onto a peeler assembly which removes the wet casings, following which the frankfurters are dried and packaged. From the cutter assembly, the conveyor travels around a "crimper open and unlatch assembly" which operates to unlatch and open the crimpers so that they are in a position to receive the stuffed casings by the time they reach the crimper close and latch assembly. Intermediate the crimper unlatch assembly and the crimper latch assembly, the conveyor travels through a washing tank for the purpose of maintaining the conveyor in a clean condition.

Further objects, features and advantages of this invention will become apparent from a consideration of the following description, the appended claims, and the accompanying drawing in which:

FIGURE 1 is a somewhat diagrammatic vertical foreshortened sectional view of the apparatus of this invention;

FIGURE 2 is an enlarged sectional view looking substantially along line 2—2 in FIG. 1 showing a crimper assembly in the apparatus of this invention, illustrating the assembly in an unlatched open position in which it receives stuffed casings, and showing one such casing positioned in the assembly;

FIGURE 2A is a fragmentary elevational view of a portion of the crimper assembly shown in FIG. 2, showing the assembly in its closed latched position and illustrating the position of the stuffed casing shown in FIG. 2 following closing of the crimper assembly;

FIGURE 3 is a transverse sectional view of the crimper assembly of this invention, looking substantially along the line 3—3 in FIG. 2;

FIGURE 4 is a transverse sectional view of the crimper assembly of this invention, looking substantially along the line 4—4 in FIG. 2;

FIGURE 5 is an enlarged view of the crimper unlatch assembly in the apparatus of this invention, looking substantially in the direction of the arrow indicated at 5 in FIG. 1, with all portions of the conveyor removed from the assembly except for the fixed plate in a crimper assembly which is about to be unlatched;

FIGURE 6 is an end view of the assembly shown in FIG. 5, with some parts broken away for the purpose of clarity;

FIGURE 7 is an enlarged elevational view of the crimper latch assembly in the apparatus of this invention looking substantially in the direction of the arrows 7 shown in FIG. 1, with the conveyor removed except for the crimper assembly which has just been closed and latched by the crimper latch assembly;

FIGURE 8 is an end view of the crimper latch assembly shown in FIG. 7 with some parts broken away for the purpose of clarity;

FIGURE 9 is a sectional view of the cutter assembly in the continuous processing apparatus of this invention looking substantially along the line 9—9 in FIG. 1;

FIGURE 10 is an end view of the cutter assembly shown in FIG. 9, with some portions broken away and other portions shown in section for the purpose of clarity;

FIGURE 11 is a side view of the peeler assembly in the apparatus of this invention;

FIGURE 11A is a detail view of a portion of the peeler assembly; and

FIGURE 12 is a front view of the peeler assembly with some parts broken away for the purpose of clarity.

With reference to the drawing, the continuous processing apparatus of this invention, indicated generally at 10, is shown in FIG. 1 as including a smoke tank or chamber 12, a cook chamber or tank 14 and a cooler chamber or tank 16, arranged in end to end relation. Each of the tanks 12, 14 and 16 has insulated walls each of which includes spaced inner and outer metal sheets 18 and 20, respectively, and a fiber glass layer 22 disposed therebetween. Smoke for flavoring and curing frankfurters processed in the apparatus 10 is supplied to the smoke chamber 12, the cook tank 14 is maintained substantially filled with a cooking liquid 24, preferably a sugar-salt solution described in detail in copending application Serial No. 28,817, filed May 13, 1960, and owned by the assignee of this application. A refrigerated liquid 26 is continuously circulated through and substantially fills the cooler tank 16. For convenience of description, the tanks 12, 14 and 16 may be hereinafter referred to as a partitioned continuous processing tank having an inlet end 28 and an outlet end 30.

A hollow frame or tank 32 disposed below and in a supporting relation with the continuous processing tank includes a detergent dip station 34 and a hot rinse station 36 at which a plurality of spray nozzles 38 are located. A frame 40 disposed adjacent the inlet end 28 of the continuous processing tank supports a feeder assembly, indicated generally at 42, which may be of the type disclosed in U.S. Patent No. 3,031,119, for continuously feeding a plurality of stuffed casings 44 to the apparatus 10. A frame 46 disposed adjacent the outlet end 30 of the continuous processing tank supports a cutter assembly, indicated generally at 48, for cutting the stuffed casings which have been cooked in the processing tank into frankfurter length sections. A peeler assembly 50, also supported on the frame 46, removes the casing sections from the processed frankfurters therein, directs the casing sections 52 into a receptacle 54, and directs the skinless frankfurters 56 onto a dryer conveyor 58 which may be of the type disclosed in copending application Serial No. 199,000, filed May 31, 1962, also owned by the assignee of this application.

An endless conveyor, indicated generally at 60, which is mounted so that it moves successively and continuously through the tanks 12, 14 and 16, consists of a pair of transversely spaced sprocket chains 62 (FIG. 2) which are connected by a plurality of crimper assemblies 64 which extend transversely therebetween. The crimper assemblies 64 are connected to the chains 62 in a substantially evenly spaced relation so that the distance between adjacent crimper assemblies 64 corresponds substantially to the desired length of the frankfurters to be processed in the apparatus 10. The conveyor 60 is trained successively about a crimper close and latch assembly, indicated generally at 66 in FIG. 1, a first pair of transversely aligned drive sprocket wheels 68, a second pair of transversely aligned drive sprocket wheels 70, the cutter assembly 48, and a crimper open and unlatch assembly 72. The assembly 66, the drive sprocket wheels 68 and 70, and the cutter assembly 48 are driven by any suitable motor arrangement (not shown) which provides for movement of the conveyor 60 in the direction of the arrow 74 so that the conveyor 60 will move successively through the tanks 12, 14 and 16. The conveyor 60 is also trained about upper and lower idler sprocket wheels 76 and 78, respectively, which are arranged in transversely aligned pairs and are disposed in the tanks 12, 14 and 16. The number of sprocket wheels 76 and 78 disposed in the tanks 12, 14 and 16 may be adjusted to provide the desired residence time of each crimper assembly 64 on the conveyor 60 in each of the tanks 12, 14 and 16. The conveyor 60 is also trained about idler sprocket wheels 80 disposed outside the tanks 12, 14 and 16 and sprocket wheels 82 which are adjustably mounted so that they can be moved to adjust the tension in the conveyor 60.

It can thus be seen that a plurality of side-by-side casings 44, stuffed with a desired comminuted meat mixture are supplied to the conveyor 60 adjacent the crimper latch assembly 66 from which the conveyor takes the stuffed casings successively through the smoke chamber 12, the cook tank 14, the cooler tank 16 and ultimately to the cutter assembly 48 where the cooked and cooled frankfurters are removed from the conveyor 60. The speed of travel of the conveyor 60, and the number of idler sprocket wheels 76 and 78 in each of the tanks may be adjusted to provide the desired end product.

*The crimper assemblies*

Each of the crimper assemblies 64 includes a pair of relatively movable plates 84 and 86 which are arranged in a side-by-side relation as shown in FIGS. 2–4, inclusive. The plate 84, hereinafter referred to as the fixed plate, is riveted at one end to one leg of an L-shape connector plate 88. A link 90 that forms a part of one of the sprocket chains 62 is supported on one end of a latch member 156, hereinafter described in detail, which is in turn secured to the other leg of the connector plate 88. At its opposite end, the fixed plate 84 is similarly riveted to a connector plate 92 which is connected to a link 94 that forms a part of the other sprocket chain 62. One edge of the fixed plate 84 is formed with a laterally projecting flange 96 and the opposite edge is formed with a plurality of substantially identical gripping teeth 98. All of the teeth 98, which are generally hook shape, face in the same direction transversely of the conveyor 60 and each tooth if formed with a back side 100 and a front side 102 which is shaped so that it has inwardly converging edges 104 and 106 which terminate in a small rounded pocket 108.

The plate 86, hereinafter referred to as the sliding plate is likewise formed at one edge with a laterally extending flange 110 which is arranged generally in alignment with the flange 96 on the fixed plate 84. The flanges 96 and 110 are of a curved construction (FIG. 3), adjacent their junctures 112 with the plates 84 and 86, so that the flanges 96 and 110 diverge from each other in a direction extending away from the plates 84 and 86, for a purpose to appear presently.

At its opposite edge, the sliding plate 86 is formed with a plurality of generally hook-shape gripping teeth 114 which are generally identical and are of a shape similar to the shape of the teeth 98 on the fixed plate 84. The teeth 114 all face in the same direction which is opposite to the direction that the teeth 98 face. Each tooth 114 has a generally upright rear side 116 and a front side 118 which is formed with inwardly converging edges 120 and 122 which terminate at their inner ends in a small rounded pocket 124.

A pair of slide studs or rivets 126 and 128 are mounted on the sliding plate 86 and extend through elongated slots 130 and 132, respectively, formed in the fixed plate 84 so they extend lengthwise thereof and are disposed adjacent the ends thereof. The slide stud 126 has an enlarged head portion 134 engageable with the sliding plate 86 and an integral washer portion 136 engageable with the fixed plate 84. A bushing 138, formed of a low friction material, is mounted on the stud 136 so that it is positioned in the slot 130. The sliding plate 86 is to some extent loosely mounted on the stud 126 so that limited movement of the sliding plate 86, in a direction laterally thereof, toward and away from the fixed plate 84 is permitted, to provide for a laterally spaced relationship of the plates 84 and 86 when a cutting knife (hereinafter described) moves therebetween.

The slide stud 128 likewise has a head 140 on one end and an integral washer portion 142 on the opposite end engageable with the fixed plate 84. A bushing 144, similar to the bushing 138, is mounted on the stud 128 so that it is positioned within the slot 132. The stud 128 also functions to connect a generally U-shape actuating member 146 to the side of the sliding plate 86 opposite to the side on which the fixed plate 84 is mounted, as shown in FIGS. 2 and 4. The sliding plate 86 is also mounted on the stud 128 in a loose manner so that some limited movement of the sliding plate 86 toward and away from the fixed plate 84 is permitted.

The U-shaped actuating member 146 has laterally extending legs 148 and 150 which are of sufficient length that they project outwardly over opposite edges of the crimper plates 84 and 86. As a result, either of the legs 148 or 150 may be engaged to move the sliding plate 86 in a direction lengthwise of the fixed plate 84. In one extreme moved position of the sliding plate 86, the slide studs 126 and 128 are at one end of the slots 130 and 132, the left end as shown in FIG. 2, and in the other extreme moved position of the sliding plate 86, the slide studs 126 and 128 are at the opposite end of the slots 130 and 132, as shown in FIG. 7.

In FIG. 2 an open position of a crimper assembly 64 is shown. In this position of a crimper assembly 64, the rear sides 100 and 116 of the teeth 98 and 114 are spaced apart such that they cooperate to form a plurality of cavities or slots 152 which are open on one side. In the illustrated embodiment of the invention, five such cavities 152 are provided in the assembly 64, but it is to be understood that more or less than this number may be provided as desired by increasing or decreasing the number of teeth 98 and 114 formed on the plates 84 and 86, respectively.

In the operation of the machine 10, five stuffed casings 44 are deposited in the cavities 152 in each crimper assembly 64 as that assembly 64 travels over the idler sprockets 80 which are positioned adjacent the crimper close assembly 66, as shown in FIG. 1. For purposes of clarity, only one casing 44 is shown positioned in a cavity 152 in FIG. 2. The crimper latch assembly 66 operates to move the actuating member 146 secured to the sliding plate 86 in a direction to the right as viewed in FIG. 2 so that the slide studs 126 and 128 are moved to the opposite ends of the slots 130 and 132. As a result each of the teeth 114 on the sliding plate 86 is moved in a direction such that its front side 118 is moved toward the front side 102 of the fixed tooth 98. As a result, the casings 44 are crimped or gathered, by the converging tooth edges 104–106 and 120–122, into the pockets 108 and 124 and the comminuted meat mixture in these crimped portions of the casings 44 is moved or squeezed in a direction longitudinally of the casings 44 out of the crimped portions of the casings into the adjacent portions of the casings. The sliding plate 86, during crimping of the casings 44, moves slightly in a direction away from the fixed plate 84 to permit the crimped portions of the casings to pucker between the crimper plates 84 and 86.

In FIG. 2A, the relative positions of the fixed teeth 98 and the movable teeth 114 in the closed position of the crimper assembly 64 are illustrated. As shown, the pockets 108 and 124 on the teeth 98 and 114, respectively, cooperate to form a very restricted space in which the casing 44 is crimped. As a result, each casing 44 is divided into frankfurter length sections 154 (FIG. 1) which are connected and which are separated by the crimper assemblies 64.

A leaf spring latch member 156 is secured at one end to the connector plate 88 on the fixed crimper plate 84 and is formed at the opposite end with a hook-shape portion 158 (FIGS. 2 and 3). An extension 160 on the slide stud 126 constitutes a latch pin which, when the slide stud 126 is moved to the opposite end of the slot 130, lifts the latch member 156 which then snaps over the latch pin 160 as shown in broken lines in FIG. 2. The latch member 156 is constructed so that it tends to assume its position shown in full lines in FIG. 2, and as a result, when the hook-shape portion 158 of the latch member is engaged with the latch pin 160, the latch member 156 effectively latches the slide plate 86 in its position shown in FIGS. 2A and 7, in which the crimper assembly 64 is closed. In order to return the crimper assembly 64 to its open position shown in FIG. 2, the latch member 156 must first be released from the latch pin 160, following which the actuating member 146 may be moved so as to return the slide plate 86 to its position shown in FIG. 2.

*The crimper open and unlatch assembly*

The details of the crimper open and unlatch assembly 72 are shown in FIGS. 5 and 6. As shown therein, the assembly 72 includes a fixed shaft 162 which extends transversely of the path of travel of the conveyor 60 and is fixed at its ends in a pair of support brackets 164 mounted on the frame 46. A circular cam ring 166, having an endless annular groove or track 168 formed therein, is keyed to an intermediate portion 170 of the shaft 162 and is maintained in a fixed position on the shaft portion 170 by a pair of nuts 172. A pair of transversely spaced sprocket wheels 174 are connected together by slide rods 176 which are arranged in pairs, as shown in FIG. 6, and in the illustrated embodiment of the invention eight pairs of slide rods 176 are provided. A generally rectangular slide bar or block 178 is slidably mounted on each pair of slide rods 176. An L-shape clip 180 is mounted on each of the slide bars 178, adjacent one end thereof, so that a leg 182 on the clip 180 extends outwardly from the side bar 178 in a direction radially outwardly of the sprockets 174. A bolt 184 on each of the slide bars 178 carries a cam follower roller 186 which is positioned within the cam track 168.

Each of the sprocket wheels 174 is secured to a bushing 188, formed of a low friction material, which is rotatably supported on the shaft 162. As a result, during rotation of the sprocket wheels 174 on the shaft 162 they rotate relative to the cam ring 166 which is fixed on the shaft 62. Consequently, during rotation of the sprocket wheels 174 each of the slide bars 178 is reciprocated by its follower roller 186 on its slide rods 176 between the extreme positions illustrated at A and B in FIG. 5, and the assembly 72 is positioned so that each slide bar 178 is moved from position A to position B during the time the slide bar 178 moves through approximately the one quarter of revolution during which each crimper assembly 64 on the conveyor 60 travels on the sprocket wheels 174.

A hollow drum 190, connected at one edge 192 to one of the sprocket wheels 174 and connected adjacent its opposite edge 194 to the other sprocket wheels 174 by means of torsion bars 196 is provided on its outer surface with ears 198 arranged in pairs. The use of the torsion bars 196 allows for some relative movement of sprocket wheels 174, without damaging assembly 72, in case one sprocket chain 62 becomes tighter than the other. A substantially L-shape latch lifting lever 200 (FIG. 6) is mounted intermediate its ends on a pin 202 carried by each pair of ears 198. A coil spring 204 extends between one end of each lever 200 and one of the bushings 188 so as to normally maintain each lever 200 in the position shown in FIG. 6 in which one leg 206 of the lever extends radially outwardly of the drum 190.

As shown in FIG. 6, the leg 206 for each of the actuating levers 200 is substantially horizontally aligned with a slide block 178, and the circumferential spacing of the levers 200 is substantially equal to the circumferential spacing of the crimper assemblies 64 during travel of the conveyor 60 on the assembly 72. As a result, as a crimper assembly 64 approaches the unlatch assembly 72, the conveyor 60 is moving in the direction of the arrow 74 shown in FIG. 6, and a leg 206 on a lever 200 moves upwardly underneath the latch member 156 on the assembly 64, engages the latch lever 156 and moves it upwardly into a clearance relation with the latch pin 160. Concurrently with this movement of the latch member 156 into clearance relation with the latch pin 160, the leg 182 on the clip 180 which is secured to the slide bar 178 that is in substantially horizontal alignment with the lever 200 engages the leg 150 on the actuating member 146 for the crimper assembly 64 which has just been unlatched by the lever 200. As the crimper assembly 64 which has just been unlatched proceeds around the sprocket wheels 174 for the assembly 72, the slide bar 178 moves from position A toward position B so as to move the actuating member 146 in a direction to slide the sliding plate 86 in the crimper assembly 64 to the solid line position shown in FIG. 2. The spring mounting of the unlatch levers 200 prevents damage to the assembly 72 in the event of any misalignment of the levers 200 with the latch members 156, since if any lever 200 is engaged by an immovable part of a crimper assembly 64, it merely pivots in a direction to stretch its biasing spring 204. Each lever 200 carries a stop member 208 which projects radially inwardly and is engageable with the drum 190 to prevent extensive movement of the lever 200 in a clockwise direction as viewed in FIG. 6.

It can thus be seen, that as each crimper assembly 64 travels past the crimper open and unlatch assembly 72, it is moved from its closed latched position shown in FIGS. 2A and 7 to its open unlatched position shown in solid lines in FIG. 2. For purposes of clarity, portions of the conveyor 60 are omitted from FIG. 5, and only the fixed plate 84 in the single crimper assembly 64 shown in FIG. 5 is illustrated.

*The crimper close and latch assembly*

The details of the crimper close and latch assembly 66 are shown in FIGS. 7 and 8. As shown therein, the assembly 66 is similar to the unlatch assembly 72 previously described in that it includes a shaft 210 fixed at its ends in brackets 212 carried by the frame 40. A cam ring 214, having a continuous cam track or groove 216 formed therein, is keyed to an intermediate portion 218 of the shaft 210 and is maintained thereon by nuts 220 on the shaft 210 threaded into engagement with opposite ends of the cam ring 214. A pair of sprockets 222, each of which carries a bushing 224 formed of a low friction material and rotatably supported on the shaft 210, are connected by slide rods 226 arranged in pairs. The sprockets 222 are also connected by a drum 228 secured at one edge to one of the sprockets 222 and connected adjacent its opposite edge to the other sprockets 222 by torsion bars 230.

Slide bars 232 are slidably mounted on the slide rods 226 so that each bar 232 is slidably mounted on a pair of slide rods 226. As shown in FIG. 8, the circumferential spacing of the slide bars 232 corresponds to the circumferential spacing of the crimper assemblies 64 on the portion of the conveyor 60 which is trained about the assembly 66.

Each of the slide bars 232 carries a cam follower roller 234 which is positioned in the cam track 216, and adjacent one end each slide bar 232 has a clip 236 secured thereto which has a leg 238 that extends outwardly from the slide bar 232 in a direction radially of the sprockets 222. Since the cam ring 214 is fixed, and the sprockets 222 are rotatable on the shaft 210, during rotation of the sprockets 222, each of the slide bars 232 slides or reciprocates on its slide rods 226 between the extreme positions illustrated at A and B in FIG. 7. The cam track 216 is shaped so that during rotation of each slide bar 232 through the angle during which the conveyor 60 is in engagement with the assembly 66, the slide bar 232 is moved from position B to position A. During such movement, the leg 238 on the clip 236 secured to the slide bar 232 is moved in a direction toward the right as viewed in FIG. 7 so as to engage the leg 148 on the actuating member 146 for a crimper assembly 64 so as to move the sliding plate 86 for the assembly 64 from left to right as viewed in FIG. 7. By the time the slide block 232 is moved to position A, the assembly 64 has been moved from its open position to its closed latched position, as shown for the assembly 64 illustrated in FIG. 7.

As shown in FIG 8, each of the slide blocks 232 supports one end 240 of a curved contour plate 242 which is spaced radially outwardly from and substantially spans the distance between adjacent slide bars 232. Bolts 244 are used to connect the end 240 of each of the contour plates 242 to a slide bar 232. Each contour plate 242 functions to support the portions of the five side-by-side stuffed casings 44 between a pair of crimper assemblies 64 during travel of the casings 44 about the crimper close and latch assembly 66.

As best appears in FIG. 1, the casings 44 are supported in the cavities 152 in a crimper assembly 64 during travel of the crimper assembly 64 across the top side of the idler sprockets 80 which are adjacent to and precede the crimper latch assembly 66. During travel of the crimper assembly 64 which has the casings 44 disposed therein about the lower and left side portions of the assembly 66 as viewed in FIG. 1, the assembly 64 is closed and latched to crimp portions of the casings 44 disposed in the cavities 152 therein. During travel around the assembly 66, each crimper assembly 64 has its fingers 98 and 114 extending inwardly toward the shaft 210, and the contour plates 242 support the casings 44 between the crimped portions thereof so as to maintain the shape of the casings 44 during travel around the assembly 66. As a result, during the time the meat stuffed casings 44 are moving from the assembly 66 toward the smoke chamber 12, they are constricted at the crimper assemblies 64 so that they are divided into frankfurter length sections indicated at 154 in FIG. 1. The casing sections 154 travel through the smoke chamber 12 where they are cured and flavored, through the cook tank 14 where the comminuted meat therein is thoroughly cooked and raised to the required temperature for health purposes, and in which the casing sections 154 which are formed of a semipermeable membrane such as cellophane, regenerated cellulose, animal intestine or the like, are thoroughly hydrated which is due at least in part to the nature of the cooking fluid 24. The principal feature of the cooking fluid 24 is that it is of a higher molecular concentration than the water in the comminuted meat mixture contained within the membranes 44. As a result, the meat mixture is not only efficiently cooked and coagulated to form frankfurters, but due to osmotic action all fluid travel through the membranes 44 is in a direction from inside the membranes. Accordingly, the cooking fluid 24 thoroughly hydrates the membranes 44 without traveling into the meat mixture so as to appreciably swell the membranes.

During travel of the casing sections 154 through the cooler tank 16 in contact with the refrigerated fluid 26, the casing sections 154 are maintained in this hydrated condition. As they emerge from the tank 16, they are subjected to a cool water rinse issuing from nozzles 246. Following subjection of the sections 154 to the action of the cool water rinse 246, they move into engagement with the cutter assembly 48.

The cutter assembly

The cutter assembly 48 is illustrated in FIGS. 9 and 10. As shown therein, the assembly 48 includes a shaft 250 which is secured to portions 252 of the frame 46 so that the shaft 250 will not rotate. A cam ring 254 is secured by bolts 256 to one of the frame portions 252 and is secured by a key 258 to a portion of the shaft 250, so that the cam ring 254 is maintained in a fixed position on the shaft 250.

A pair of transversely aligned and spaced sprocket wheels 260 and 262 are mounted on bushings 263 which are rotatably supported on the shaft 250. A circular drum 264 secured to the sprocket wheel 260 so that it encircles the cam ring 254 carries a pair of rings 266, disposed radially inwardly thereof, in which a plurality of bushings 268 are mounted. The bushings 268 are arranged in aligned pairs and in the illustrated embodiment of the invention ten pairs of bushings 268 are utilized.

A push-pull rod 270 is slidably mounted in each pair of bushings 268. The inner end of each of the rods 270 is formed with a reduced thickness section 272 which is flattened on opposite sides so that it fits between the spaced leg portions 274 of a yoke member 276 (FIG. 10). A pin 278 extended through the rod portion 272 carries slide blocks 280 which are slidably mounted in grooves 282 in the yoke legs 274.

A knife 284 having a cutting edge 286, is adjustably mounted by bolts 288 on an arm 290 which is disposed in a side-by-side relation with the yoke 276 (FIG. 10). The bolts 288 also connect the arm 290 to the yoke 276. A spring 292, adjustably connected at one end to the knife 284, is connected at the opposite end to an ear 294 carried by the yoke 276 to positively connect the knife 284 and yoke 276 for concurrent movement. The yoke 276 and the arm 290 for each push-pull rod 270 are pivotally supported on a pin 296 carried by a connecting bar or plate 298 which engages one side of the arm 290 and functions as a guide plate for the knife arm 290. The knives 284, correspond in number to the number of the push-pull rods 270, ten in number in the illustrated embodiment of the invention, and the same number of connecting bars 298 are provided, although only two are shown for purposes of clarity.

The connecting bars 298 extend between a pair of frame members 300 which are mounted inwardly of and adjacent the inner sides of the sprockets 260 and 262. The frame members 300 are connected to and supported on a bushing 301 which is rotatably supported on the shaft 250. Each of the frame members 300 is adjustably connected to the adjacent sprocket wheel 260 or 262 by bolt assemblies 302, and a cam and slot assembly 304 extends between each of the frame members 300 and the adjacent sprocket wheel to facilitate adjustment of the frame members 300 relative to the sprocket wheels 260 and 262 to align the knives 284 with the crimper assemblies 64 on the conveyor 60. The circumferential spacing of the knives 284, about the sprocket wheels 260 and 262, is identical to the spacing of the crimper assemblies 64 on the sprocket wheels 260 and 262.

An alignment bumper 306 (FIG. 10), preferably formed of rubber, is mounted on the outer end of each of the connecting bars or plates 298 for the purpose of aligning a crimper assembly 64 with a knife 284 as shown in FIG. 10. As shown therein, the knife 284 is of a thickness such that it can be moved into the space between the laterally spaced crimper plates 84 and 86. As a result, during rotation of the sprockets 260 and 262, and the frame members 300, each of the push-pull rods 270, which carries a cam follower roller 308 disposed in a cam track 310 in the cam ring 254, is reciprocated by its roller 308 so that the knife 284 carried thereby is moved between inner and outer positions indicated at X and Y in FIG. 9. As indicated diagrammatically in FIG. 1, when a crimper assembly 64 is moved to an initial position on the cutter assembly 48, one of the knives 284, is radially aligned with the space between the crimper plates 84 and 86 and the knife is in inner or retracted position X. As this crimper assembly 64 proceeds partially around the cutter assembly 48, the cam follower 308 on the rod 270 for that knife 284 moves the knife quickly from position X to operative or cutting position Y so that the knife 284 moves radially outwardly and cuts the crimped portions of the casings 44 carried by the crimper assembly 64. As shown in FIG. 1, at the time a knife 284 moves to position Y, so as to cut the casings 44, the casings 44 are on the underside of the cutter assembly 48 so that the severed sections 154 of the casing 44, with the comminuted meat mixture confined therein, fall from the cutter assembly 48.

It can thus be seen that the knives 284 are coordinated by the push-pull rods 270 which actuate the knives 284 so that they move between retracted positions, indicated at X, and cutting positions, indicated at Y, in a timed relation with the crimper assemblies 64 in the conveyor 60 as the crimper assemblies 64 are traveling around the cutter assembly 48 so as to cut the casing 44 into frankfurter length sections and release these sections from the conveyor 60.

The peeler assembly

Each stuffed casing section 154 released from the conveyor 60 by the cutter assembly 48 falls into a gravity conveyor or chute assembly 310 which directs the stuffed casing section 154 onto the peeler assembly 50. As shown in FIG. 11, each stuffed casing section 154 consists of a length 52 of casing disposed about a skinless frankfurter 56. Because the casing was originally crimped between longitudinally adjacent frankfurters 56 by the crimper assemblies 64 each length 52 of the casing cut from the conveyor 60 is slightly longer than the frankfurter 56 which it encloses, so that the casing section 52 has end portions 312, only one of which is shown, which extend slightly beyond the ends of the frankfurter 56 therein.

The gravity conveyor 310 includes a plurality of substantially upright inclined chutes 314 (FIG. 12) arranged so that the stuffed casing sections 54, traveling end to end, fall onto the upper ends of the chutes 314. The number of chutes 314 corresponds to the number of side-by-side stuffed casing sections 44, five in the illustrated embodiment of the invention, which are simultaneously processed in the apparatus 10. A deflector 316 prevents the stuffed casing sections 154 from traveling past the chutes 314 as they approach the upper ends of the chutes 314.

The stuffed casing sections 154 slide, one by one, down the chutes 314, until the lower end of each stuffed section 154 engages the top sides of a pair of peeler rolls or rollers 318 mounted in a side-by-side relation immediately below the chutes 314. The rolls 318 are of a length such that they extend completely across the lower ends of the side-by-side chutes 314 and are journaled on pillow blocks 320. One of the rolls 318 is driven by drive shaft 322 connected to a gear box 324 powered by a motor 326. Gears 328, only one of which is shown, provide for rotation of the other roll 318 on rotation of the first roll 318. The shaft 322 provides for rotation of the rolls 318 at high speed in the relatively opposite directions indicated by the arrows in FIG. 11A so that the top sides of the rolls are moving toward each other. The rolls 318 are provided with rough, preferably knurled, outer surfaces 330, and the rolls 318 are mounted so that their surfaces 330 are in a very close spaced relation. As a result, when the lower end of a stuffed casing 154 engages the top surfaces of the rolls 318, the projecting end section 312 of the casing 52 at the lower end of the stuffed section 154 is quickly gripped between the rolls 318 so that it is moved in a direction longitudinally of the frankfurter 56 enclosed within the casing section 52. Since the roll top surfaces 330 are converging they quickly move the casing 52 longitudinally of the frankfurter 56, even in the absence of the projecting casing end section 312, which does, however, facilitate gripping of casing 52 by rolls 318.

Because the casing 52 is thoroughly hydrated in the cook tank 14, and because the meat within the casing section 52 has not been swelled or expanded by the addition of water thereto, and additionally because small amounts of fluid in the meat mixture have been withdrawn through the casing section 52 so that some of the mixture fluid is at the surface of the frankfurter 56, the wet casing 52 readily slides lengthwise off the wet frankfurter 56.

By virtue of the rapid rotation of the peeler rolls 318, and the closely spaced relation of the rolls 318 so that the frankfurter 56 cannot pass therebetween, but so that the casing end section 312 is readily gripped, the casing section 52 is withdrawn from the frankfurter 56 therein in a matter of a fraction of a second. In order to quickly remove the frankfurter 56 which is in a substantially upright position supported on the top sides of the rolls 318, a jet of air is supplied to each of the chutes 314 through a hose 332 connected to a suitable source 334 of air under pressure. Air from each hose 332 travels through an orifice 336 in each of the chutes 314 at a position such that the air jet will engage a frankfurter 56 supported on the peeler rolls 318 adjacent the upper end of the frankfurter 56. The force applied to the frankfurters 56 by air issuing from the orifices 336 is insufficient to alter the course of the stuffed frankfurter sections 154 as they slide down the chutes 314. However, once a frankfurter section 154 comes to rest in the substantially upright position supported on the rolls 318, the force of a jet of air from an orifice 336 directed against the side of the frankfurter adjacent its upper end is sufficient to topple the frankfurter 56 off one side of the rolls 318 as shown in FIG. 11. Stationary rods 340 mounted on the peeler frame 342 prevent the frankfurters 56 from falling sideways and becoming lodged between the peeler rolls 318.

The skinless frankfurter 56 then falls onto a drying conveyor 58, and, if desired, additional chutes 338 (FIG. 1) may be employed to direct the frankfurters 56 onto the conveyor 58. The removed casing sections 52 fall downwardly between the rolls 318 as shown in FIG. 11.

From the above description it is seen that this invention provides a method and apparatus for processing frankfurters which is continuous in the sense that a plurality of side-by-side stuffed frankfurters casings 44 are fed to the inlet end of the apparatus 10 and a plurality of fully processed skinless frankfurters 56 are removed from the outlet end of the apparatus 10. By virtue of the condition of the stuffed frankfurter sections 154 which are removed from the conveyor 60 at the cutter assembly 48, the casing lengths 52 are readily slid lengthwise off the frankfurters 56 therein at the peeler assembly 50. This ease of removal of the casing lengths 52 is due to the hydrated condition of each casing length 52, the fluid between the casing length 52 and the frankfurter 56 therein, which fluid acts like a lubricant, and the fact that the frankfurters 56 have not been expanded in the apparatus 10 to an extent such that the casing lengths 52 tightly encircle the frankfurters. The crimper assemblies 64 are constructed so that they coact with the crimper close assembly 66 and the crimper open assembly 72 so that they are open to receive the stuffed casing sections 44, as they are fed to the apparatus 10, and close on the stuffed casings 44 so as to crimp them prior to entry into the smoke chamber 12. The crimper assemblies 64 are latched, by the latch member 156 and the latch pin 160 on each assembly 64 so that accidental release of the stuffed casings 44 during travel around the many idler sprockets 76 and 78 in the apparatus 10 is positively precluded. The crimper assemblies 64 are constructed so that they coact with the cutter assembly 48 to provide for cutting of the crimped portions of the stuffed casing so as to release stuffed casing sections of desired lengths from the conveyor 60. Furthermore, the stuffed casings 44 are crimped by the assemblies 64 so as to provide excess casing 52 at the ends of each frankfurter 56 to facilitate removal of the casing 52 in the simplified peeler 50.

It will be understood that the improved apparatus for continuously processing frankfurters which is herein disclosed and described is presented for purposes of explanation and illustration and is not intended to indicate limits of the invention, the scope of which is defined by the following claims.

What is claimed is:

1. In a machine for continuously processing frankfurters, a conveyor, crimper assemblies mounted at evenly spaced positions on and extending transversely across said conveyor, each of said assemblies comprising a fixed plate having substantially identical gripping fingers projecting from one edge thereof, each of said fingers having a front side formed with a pocket facing in one direction transversely of said conveyor and a back side facing in the opposite direction, a slide plate mounted in a side-by-side relation with said fixed plate and having a plurality of substantially identical gripping fingers projecting from one edge thereof and arranged side by side with the fingers on said fixed plate, said slide and fixed plates being spaced apart in a lateral direction a slight distance and having the space therebetween unobstructed to permit movement of a knife therebetween, relatively diverging flanges on the opposite edges of said plates facilitating movement of a knife into the space between said plates, each of said slide plate fingers having a front side formed with a pocket facing in said opposite direction and a back side facing in said one direction, means slidably mounting said slide plate on said fixed plate so that said plates are laterally spaced apart and said slide plate is movable between a first position in which the back sides of said fixed and slide fingers form a plurality of open-sided cavities for the reception of a plurality of stuffed frankfurter casing and a second position in which the front sides of said fingers are moved toward each other to constrict said casings within the pockets formed therein, and coacting means on said fixed and slide plates for releasably maintaining said slide plate in said second position thereof.

2. In a machine for continuously processing frankfurters, a conveyor, crimper assemblies mounted at evenly spaced positions on extending transversely across said conveyor, each of said assemblies comprising a fixed plate having substantially identical gripping fingers projecting from one edge thereof, each of said fingers having a front side formed with a pocket facing in one direction transversely of said conveyor and a back side facing in the opposite direction, a slide plate mounted in a side-by-side relation with said fixed plate and having a plurality of substantially identical gripping fingers projecting from one edge thereof and arranged side by side with the fingers on said fixed plate, said slide and fixed plates being spaced apart in a lateral direction a slight distance and having the space therebetween unobstructed to permit movement of a knife therebetween, relatively diverging flanges on the opposite edges of said plates facilitating movement of a knife into the space between said plates, each of said slide plate fingers having a front side formed with a pocket facing in said opposite direction and a back side facing in said one direction, means slidably mounting said slide plate on said fixed plate so that said plates are laterally spaced apart and said slide plate is movable between a first position in which the back sides of said fixed and slide fingers form a plurality of open-sided cavities for the reception of a plurality of stuffed frankfurter casings and a second position in which the front sides of said fingers are moved toward each other to constrict said casings within the pockets formed therein, a spring latch member mounted at one end on said fixed plate and having a generally hook shape opposite end, and a latch pin on said slide plate movable into a position engaged with said hook shape latch end in said second position of said slide plate.

3. In a machine for continuously forming skinless frankfurters from a plurality of meat suffed cellulose casings arranged in a spaced side-by-side relation, processing tank means having an inlet end and an outlet end, an endless conveyor positioned so that it enters the tank means at the inlet end and emerges from the outlet end thereof, crimper assemblies mounted on and extending transversely across said conveyor, said crimper assemblies being substantially evenly spaced-apart in a direction corresponding to the direction of travel of said conveyor so that the distance between adjacent assemblies corresponds substantially to the desired length of said frankfurters, each of said assemblies comprising a fixed plate having gripping fingers projecting from one edge thereof, a sliding plate mounted in a side-by-side closely spaced relation with said fixed plate and having a plurality of gripping fingers projecting from one edge thereof and arranged side by side with the fingers on said fixed plate, said sliding plate being movable between a first position in which said plates form a plurality of open-sided cavities for the reception of said stuffed frankfurter casings and a second position in which certain of said fingers are moved toward each other to crimp portions of said casings therebetween so as to divide each casing into frankfurter length sections, crimper actuating means on said sliding plate, means adjacent the inlet end of said tank means movable transversely of said conveyor and engageable with the actuating means on each of said crimper assemblies so as to move said sliding plate to said second position, knife means spaced from the outlet end of said tank means and mounted for movement between the plates in each crimper assembly so as to sever the portions of said casings crimped therebetween and release certain of said frankfurter length sections from said conveyor, means engageable with said actuating means on each crimper assembly so as to move the sliding plate therein to said first position following movement of said knife means between the plates for said assembly, peeler means for removing said casing sections from the processed meat therein, and means for directing stuffed sections released from said conveyor at said knife means to said peeler means.

4. In a machine for continuously processing elongated tubular membranes stuffed with a comminuted meat mixture so as to form skinless frankfurters in which said membranes are mounted on a processing conveyor which crimps longitudinally spaced portions of the membranes so as to divide each membrane into sections of predetermined lengths each of which encloses a generally cylindrical meat formation of shorter length, means for wet cooking said conveyor mounted membrane so as to withdraw some fluid from the meat mixture therein and hydrate said membrane, means for cutting said casing substantially at said longitudinally spaced portions to release cut membrane sections from said conveyor and to divide said membrane into separate sections having end portions which extend beyond the ends of the cylindrical meat formation therein, and means for removing each said membrane section from the meat formation therein, said removing means comprising a pair of knurled rolls positioned in a closely spaced side-by-side substantially horizontal relation below said cutting means, means rotating said rolls so that the top sides thereof move toward each other, chute means for feeding said membrane sections downwardly in generally upright positions from said cutting means toward said rolls so that each membrane has one end portion thereof gripped between said rolls and drawn longitudinally off the meat formation therein, and means providing air jet means directed transversely of said chute means toward meat formations having the membranes thereon gripped by said rolls for moving said meat formation off one side of said rolls following removal of the membrane therefrom.

5. In a machine for continuously processing frankfurters, a conveyor, crimper assemblies mounted at evenly spaced positions on and extending transversely across said conveyor, each of said assemblies comprising a fixed plate having gripping fingers projecting from one edge thereof, a sliding plate mounted in a side-by-side relation with said fixed plate and having a plurality of gripping fingers projecting from one edge thereof and arranged side by side with the fingers on said fixed plate, relatively diverging flange means on the opposite edges of said plates, said sliding plate being movable between a first position in which said fixed and sliding fingers form a plurality of open-sided cavities each of which has a fixed finger on one side and a sliding finger on the opposite side for the reception of a plurality of stuffed frankfurter casings in said cavities between said fingers and a second position in which said sliding fingers are moved toward the fixed fingers on the opposite sides of said cavities to constrict each of said casings between a fixed and a sliding finger, means for cutting said casings at the constrictions formed therein by said crimper assemblies, said cutting means comprising rotatable sprocket means about which said conveyor is trained, a plurality of knives mounted for rotation with said sprocket means, each of said knives being mounted for movement substantially radially of said sprocket means between a retracted position out of the path of travel of crimper assemblies on said conveyor and a cutting position extending between the plates in a crimper assembly in a direction from the flanged edges thereof, and means responsive to rotation of said sprocket means for continuously moving each of said knives between said positions therefor.

6. In a machine for continuously processing frankfurters, a conveyor, crimper assemblies mounted at equally spaced positions on and extending transversely across said conveyor, each of said assemblies comprising a fixed plate having gripping fingers projecting from one edge thereof, a sliding plate mounted in a side-by-side relation with said fixed plate and having a plurality of gripping fingers projecting from one edge thereof and arranged side by side with the fingers on said fixed plate, said sliding plate being movable between a first position in which the fixed and sliding fingers form a plurality of open-sided cavities for the reception of a plurality of stuffed frankfurter casings and a second position in which certain of said sliding fingers are moved toward said fixed fingers to constrict said casings therebetween, an actuating member secured to said sliding plate, rotatable sprocket means about which said conveyor is trained, a plurality of members mounted on said sprocket means for movement in a direction transversely of said conveyor in response to rotation of said sprocket means, said members being mounted on said sprocket means in a spaced relation corresponding to the spacing of said crimper assemblies on said conveyor, and a projection on each of said members engageable with a crimper assembly actuating member during travel of said crimper assembly about said sprocket means so as to move the sliding plate secured to said actuating member from one position thereof to the other.

7. In a machine for continuously processing frankfurters, a conveyor, crimper assemblies mounted at equally spaced positions on and extending transversely across said conveyor, each of said assemblies comprising a fixed plate having gripping fingers projecting from one edge thereof, a sliding plate mounted in a side-by-side relation with said fixed plate and having a plurality of gripping fingers projecting from one edge thereof and arranged side by side with the fingers on said fixed plate, said sliding plate being movable between a first position in which the fixed and sliding fingers form a plurality of open-sided cavities for the reception of a plurality of stuffed frankfurter casings and a second position in which certain of said sliding fingers are moved toward said fixed fingers to constrict said casings therebetween, an actuating member secured to said sliding plate, rotatable sprocket means about which said conveyor is trained, a plurality of members mounted on said sprocket means for movement in a direction transversely of said conveyor, means including a stationary cam and cam followers attached to said members for moving each of said members in said direction in response to rotation of said sprocket means, said members being mounted on said sprocket means in a spaced relation corresponding to the spacing of said crimper assemblies on said conveyor, and a projection on each of said members engageable with a crimper assembly actuating member during travel of said crimper assembly about said sprocket means so as to move the sliding plate secured to said actuating member from one position thereof to the other.

References Cited by the Examiner

UNITED STATES PATENTS

| | | | |
|---|---|---|---|
| 1,581,236 | 4/1926 | Speer | 83—337 X |
| 1,651,472 | 12/1927 | Schmelz | 99—109 X |
| 1,825,528 | 9/1931 | Knudsen | 99—109 |
| 2,136,106 | 11/1938 | Kern | 99—109 |
| 2,340,755 | 2/1944 | Jacobson. | |
| 2,434,316 | 1/1948 | Golden et al. | 17—1 |
| 2,623,451 | 12/1952 | Prohaska | 99—352 |
| 2,660,754 | 12/1953 | Roshko | 17—2 |
| 2,675,753 | 4/1954 | Eber | 99—261 |
| 3,026,877 | 3/1962 | Smith | 130—30 |

CHARLES A. WILLMUTH, *Primary Examiner.*

H. LORD, ROBERT E. PULFREY, *Examiners.*

STUART E. BECK, *Assistant Examiner.*